United States Patent [19]

Lucas et al.

[11] 4,164,743
[45] Aug. 14, 1979

[54] DRIVE ARRANGEMENT FOR AN INSTRUMENT LANDING SYSTEM GLIDEPATH ANTENNA

[75] Inventors: James G. Lucas, Wahroonga; Alan C. Young, West Pennant Hills, both of Australia

[73] Assignee: University of Sydney, Sydney, Australia

[21] Appl. No.: 848,693

[22] Filed: Nov. 4, 1977

[30] Foreign Application Priority Data

Nov. 12, 1976 [AU] Australia .............................. PC8121

[51] Int. Cl.² .......................... H01Q 3/26; G01S 1/08
[52] U.S. Cl. .................................... 343/854; 343/107
[58] Field of Search ................... 343/107, 108 R, 854, 343/853, 816, 846

[56] References Cited

U.S. PATENT DOCUMENTS 3,409,890  11/1968  Redlich ........................... 343/108 R Primary Examiner—Eli Lieberman
Attorney, Agent, or Firm—Ladas, Parry, Von Gehr, Goldsmith & Deschamps

[57] ABSTRACT

A drive arrangement for an instrument landing system (ILS) glidepath antenna array, the drive system providing for a shorter image ground than is required by the known null reference, sideband reference or M-array systems. The drive system is applicable to an antenna array structure which is similar to an M-array structure, but the drive signals are fundamentally different from the M-array drives and the resultant field pattern does not have the "scooped portion" characteristically associated with the M-array system. A three element array structure is employed, with SBO signals driving each of the elements and CSB signals driving also two of the elements.

2 Claims, 8 Drawing Figures d = INTERELEMENT SPACING
$A_n$ = ANTENNA DRIVE CURRENT
$\theta$ = ANGLE TO RECEIVER
R = DISTANCE TO RECEIVER FROM THE LOWEST ANTENNA
$r_n$ = DISTANCE TO RECEIVER FROM THE nth ELEMENT

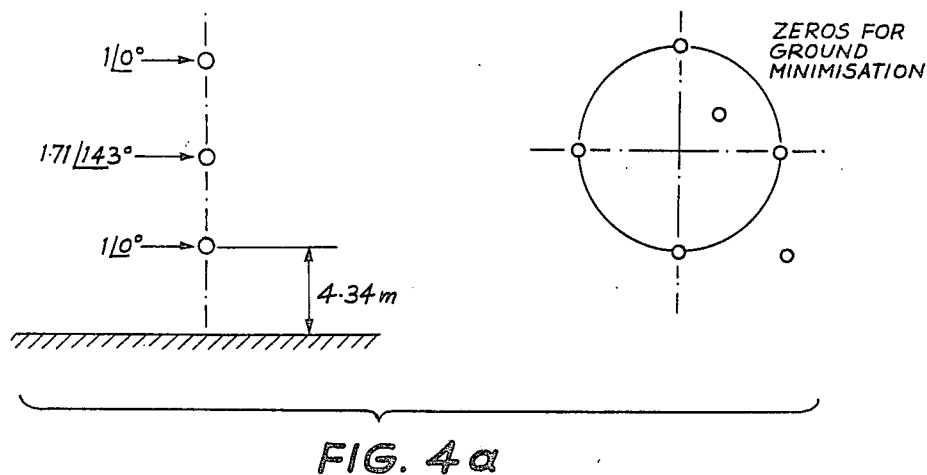
FIG. 4a
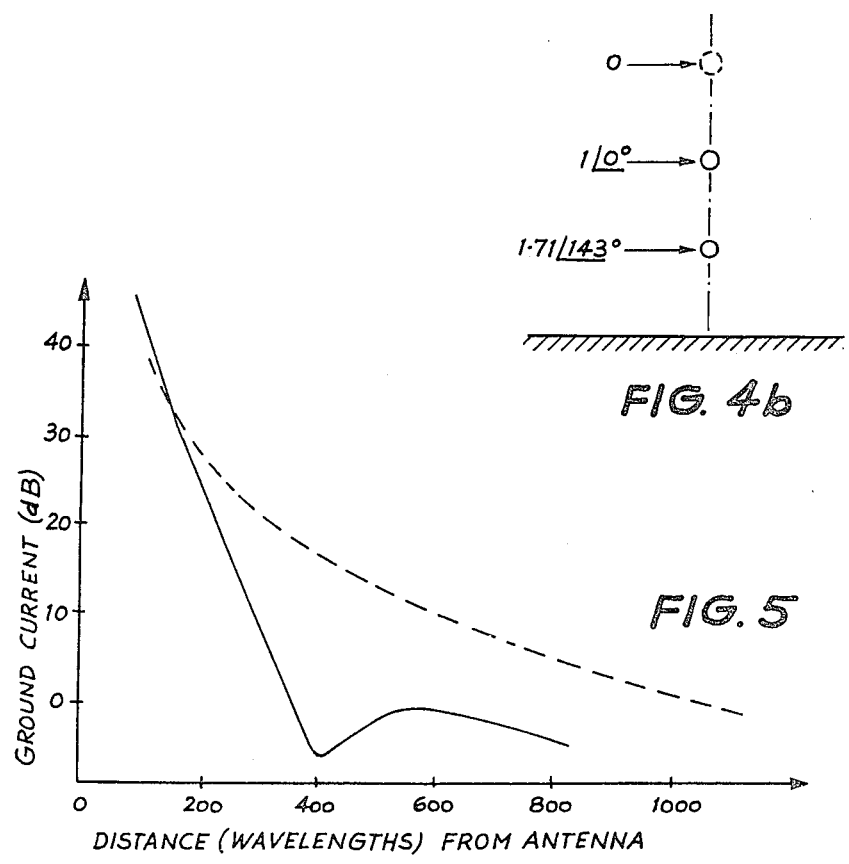
FIG. 4b
FIG. 5

DRIVE ARRANGEMENT FOR AN INSTRUMENT LANDING SYSTEM GLIDEPATH ANTENNA

1. Field of the Invention

This invention relates to a drive arrangement for an instrument landing system (ILS) glidepath antenna array, the drive arrangement being applicable particularly to an antenna array for siting in locations demanding a relatively short image plane ground requirement.

2. Prior Art

Instrument landing systems developed prior to and since the year 1946, when the ILS international standard was adopted, may be catagorized as falling within one of three groups; the null reference system, the sideband reference system or the M-Array system.

The simplest of the ILS systems is the null reference system. This uses an array having two vertically disposed antenna elements, with the lower antenna element being located at one-half the height above ground of the upper antenna element. A reference signal equally modulated by phase locked 90 Hz and 150 Hz tones (CSB) is fed to the lower antenna element producing a lobed pattern with its first maximum above the ground at 3° and the first null at 6°. The upper antenna element radiates only 90 Hz and 150 Hz sideband energy (SBO) producing a lobed pattern with a first maximum above ground at 1.5° and the first null at 3°. This first sideband null at 3° establishes the angle of the glidepath and the path width is formed within the region of the null. The signals are phased such that the sideband signals radiated by the upper antenna element and the lower antenna element reference signal add below the null to give predominantly fly-up sidebands (150>90) and above the null to give predominantly fly-down sidebands (90>150). The path is formed in a region of high signal strength and the receiver simply separates and compares audio tones.

The null reference system typically has a flat and level image ground requirement of 800 meters, for a 3° glide-path, and, because the sideband pattern rises approximately linearly from 0°, the system is very susceptible to above-ground interference.

Glidepath sites are rearely ideal and antenna arrays must frequently operate with short ground planes or above-ground obstacles in the forward region. Either of these unfavourable conditions can severely degrade the performance of the null reference system and, to cope with such problem sites, the side band reference and the M-array systems were proposed.

The sideband reference system has been one of the most commonly used glidepath systems since 1960 and it employs two driven antenna elements, one located above the other. The upper element is driven with a SBO signal and the lower element is driven with both CSB and SBO signals. The SBO signal to the lower element is 180° displaced with respect to the SBO signal driving the upper element. This, sideband reference system is just as susceptible to above-ground interference as the null reference system, but it has the merit of requiring an image plane of only 700 meters, for a 3° glidepath angle.

The M-array system has also been widely used since 1960 and is often referred to as the Capture Effect array when used with clearance signals. The system uses a three-element array with the upper, lower and middle elements being driven with SBO signals, and the middle and lower elements being driven also with CBS signals. The upper and lower element SBO drive signals have amplitude and phase $1\angle 0°$, whilst the middle element SBO signal has amplitude and phase $2\angle 180°$. The middle element CSB drive signal has amplitude and phase $1\angle 0°$ and the lower element CSB signal has amplitude and phase $2\angle 180°$.

The M-array system has an image ground requirement of 550 meters, i.e. significantly less than the null reference system, and, under ideal conditions, the system has low susceptibility to above-gound interference. Thus, the M-array field has a characteristic "scooped-out" pattern above 0° along the extended centreline of a runway and any above-ground obstacles along the extended centreline will not significantly affect the system performance. But the presence of obstacles in other regions displaced laterally from the centreline may cause interference, as may in-line objects if the array is defocussed.

Although the sideband reference and M-array systems respectively have advantages over the null reference system in terms of image ground requirements and above-ground interference susceptibility, they are not so stable as the null reference system, in which a 10% drive error causes a change only in the path width. In the case of the sideband reference system a 10% error may cause a shift in the glidepath angle by plus or minus one-third degree, and in the case of the M-array system a 10% drive error varies the glidepath angle by plus or minus one-quarter degree. However, of greater concern in the case of the M-array system is that a false glidepath at angles up to 1.18° to the ground may be created and the amplitude and phase of drives to the array must therefore be closely monitored.

The sideband reference and the M-array systems were developed by the trial and error method of adding sinewave space patterns.

DEVELOPEMENT OF THE INVENTION

The inventors have now taken an an analytical approach to the design of ILS antenna arrays to suit various siting requirements and have developed the work of Schelkunoff (referred to hereinafter) to produce a family of array designs which are related by a common mathematical treatment.

SUMMARY OF THE INVENTION

The present invention is directed to novel drive arrangement for an antenna array, the drive arrangement constituting one of the family of designs referred to above. The drive arrangement of this invention does not provide for such low susceptibility to above-ground interference as the current M-array system, but the drive arrangement of the present invention does provide for greater stability of operation than the M-array system and it does provide for a significantly shorter image plane requirement than that of any of the previous systems, including the M-array system.

Thus, the present invention provides a drive arrangement for an instrument landing system (ILS) antenna array having three vertically arrayed elements, all three elements being arranged to be driven to radiate SBO energy and the lowermost and central element being arranged to be driven to also radiate CBS energy; the relative amplitude and phase of the driving signal to the respective elements being given by:

lowermost and uppermost elements $SBO = 1\angle 0°$
centre element $SBO = 1.71\angle 143°$
centre element $CSB = 1\angle 0°$ lowermost element CSB=1.71∠143°

The drive magnitudes as above quoted may vary as between one another by ±15% and the respective phase angles may vary by ±10°.

The physical construction of the antenna array as above defined in the same as that applicable to the well known M-array system. However, the drives applied to the array elements are different from those applied to the M-array system and the field pattern produced is fundamentally different from that applicable to the M-array system.

Each element above specified may comprise a single dipole mounted within a corner reflector to achieve a desired directivity. However, it is to be understood that each element as such may be constituted by an array of elements (e.g. a Yagi array) for the purpose of obtaining directivity.

The present invention will be more fully understood from the following description of its development and a preferred embodiment thereof, the description being given with reference to the accompanying drawings.

IN THE DRAWINGS

FIG. 1 is a diagram of a Schelkunoff linear array,

FIG. 2 is a circle diagram in the complex plane described by a variable in the field angular variation expression derived by Schelkunoff, FIG. 3 is a diagram of a linear array which is extended to include an image array, FIGS. 4a and 4b show SBO and CSB excitation of elements of an array in accordance with a preferred embodiment of the invention, FIG. 5 shows a ground current plot for the array when excited as shown in FIGS. 4a and 4b, and, FIG. 6 shows a characteristic field pattern produced by the array when excited as shown in FIGS. 4a and 4b, FIG. 7 shows the array in accordance with the preferred embodiment, including the SBO and CSB drive signals, and a drive system scheme for the array.

DETAILED DESCRIPTION OF THE INVENTION

Figure 1:
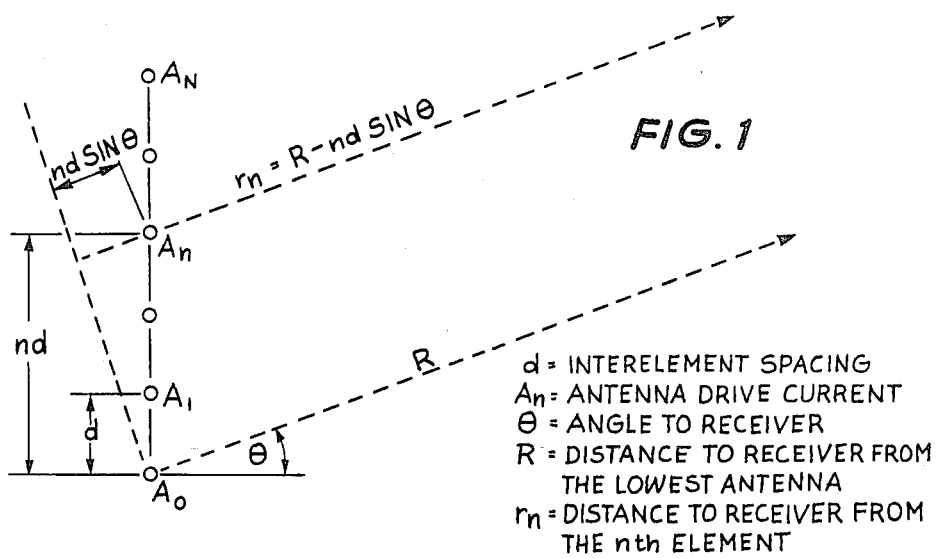

In respect of the simple array shown in FIG. 1, S. A. Schelkunoff developed a theory ("A mathematical theory of linear arrays", BSTJ 22,1, pages 80–107, (1943)) for the analysis of linear equi-spaced arrays which is based on a simple circle diagram. The angular variation of the field of the array of FIG. 1 can be shown to be completely described by the expression $$\text{Field} \propto F(Z) = \sum_{n=0}^{N} A_n Z^n$$

where
$A_n$ are the antenna drives,
and $Z = e^{j\Psi}$,
and $\Psi = (2\pi/\lambda \cdot d) \sin \theta$ This polynomial in Z has roots (zeros) and can be factorized into N factors given as $$F(Z) = (Z - Z_1)(Z - Z_2)(Z - Z_3) \ldots (Z - Z_n)$$

where $Z_n$ are the N zeros of $F(Z)$.

Figure 2:
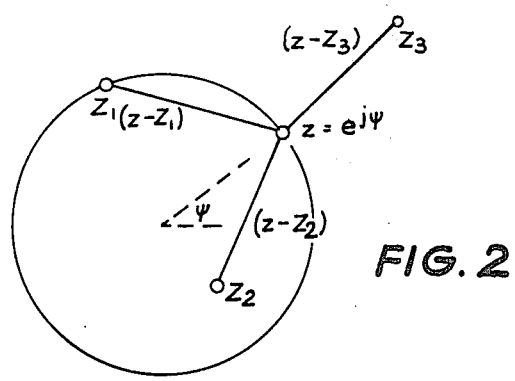

The variable $Z = e^{j\Psi}$ describes a unit circle in the complex plane, shown in FIG. 2, and the field pattern is developed by moving around this unit circle taking the product of all the distances $(Z - Z_n)$ from this general point Z to all the zeros. This allows the field pattern to be easily visualized. For the angles used in glidepath analysis $\Psi$ is proportional to the angle of elevation $\theta$.

Figure 3:
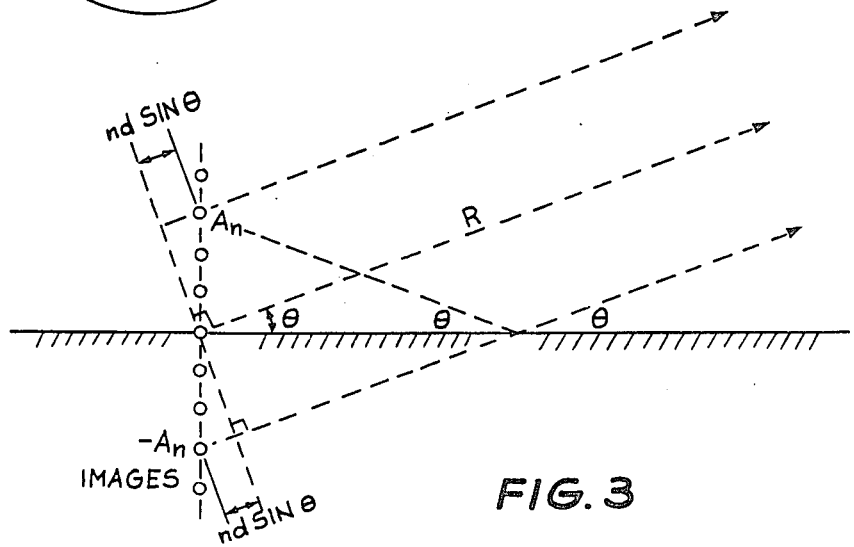

The inventors have extended the abovementioned Schelkunoff theory to cover horizontally polarized image arrays as shown in FIG. 3. This is considered as having a dummy zero element in the ground plane and negative image elements, in addition to the above-ground driven elements. The field from the driven elements has a phase lead whilst that from the image elements has an identical phase lag and Z becomes $Z^{-1}$. It then follows that the field from the array of images must be added to that from the driven (above-ground) array to give the array polynomial and since $A_o$ (the dummy ground element) is zero then $$F(Z) = \sum_{n=1}^{N} (A_n Z^n + (-A_n) Z^{-n}).$$

Since this can be expressed as $$F(Z) = (A_N Z^{2N} + A_{N-1} Z^{2N-1} \ldots A_{N-1} Z - A_N),$$

the image polynomial always has 2N zeros.

A factor of $(Z - Z^{-1})$ is always present in an image array polynomial and since $(Z - Z^{-1}) = (1/Z)(Z - 1)(Z + 1)$ a pair of zeros always occurs on the unit circle at $Z = +1$ and at $Z = -1$. The zero at $Z = +1$ means that $F(Z)$ is zero on the horizon, as expected. The denominator always has a magnitude of unity and does not effect the magnitude of $F(Z)$.

All other zeros occur as pairs of inverses at $Z_n$ and at $1/Z_n$, this contributing a pair of factors of the form $$(1/Z)(Z - Z_n)(Z - (1/Z_n)) = (Z + P_n + Z^{-1})$$

wherein $P_n = -(Z_n + (1/Z_n))$.

Since there are N such factors the image polynominal becomes $$F(Z) = (Z - Z^{-1})(Z + P_2 + Z^{-1})(Z + P_3 + Z^{-1}) \ldots (Z + P_n + Z^{-1})$$

This is the fundamental glide path design equation developed by the inventors and from which the array and drives of the present invention are generated.

Thus, the inventors have found that by placing zeros at the $Z = j1$, $-j1$, 1 and $-1$ points on the circle diagram, and by adding still further zeros at points not on the unit circle, the amount of image ground requirement is significantly reduced. The placement of the further zeros, off the unit circle, results in redistribution of induced currents (which cause ground reflections) from the far ground to the near ground, this in turn de-emphasising the far ground contribution to the glide-path operation.

This approach has led to the array of the present invention and as shown in FIGS. 4a and 4b. FIG. 4a shows the (relative) SBO drive magnitude and phase for the respective elements, and shows also the SBO zero positions in the complex plane. FIG. 4b shows the (relative) CSB drive magnitudes and phases.

Figure 6:
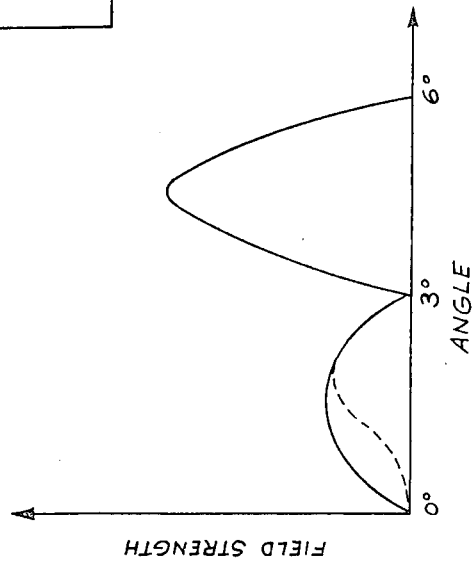

The ground current plot for the array (when driven with the signals shown in FIGS. 4a and 4b) is shown in FIG. 5. This curve shows that the ground current is very small beyond 400 λ (i.e. approximately 320 meters for a 330 MHz reference frequency) when compared with the null reference system plot shown in dotted outline in the same Figure. With such a short ground plane requirement the ground up to the normal runway threshold provides a sufficient reflective surface. Also, it has been found that the driven array provides a stable performance but, as is shown in FIG. 6, the array does not produce a field pattern having the "scooped-out" characteristic of the M-array system and it is therefore more susceptible to the above-ground obstacles than a properly focussed M-array system. However, the array of the present invention has been developed for use on very short ground planes with a minimum of above-ground obstructions in the forward region, but the susceptibility to above-ground interference of the array of the present invention is still less than that of the null reference system and sideband reference system.

Figure 7:
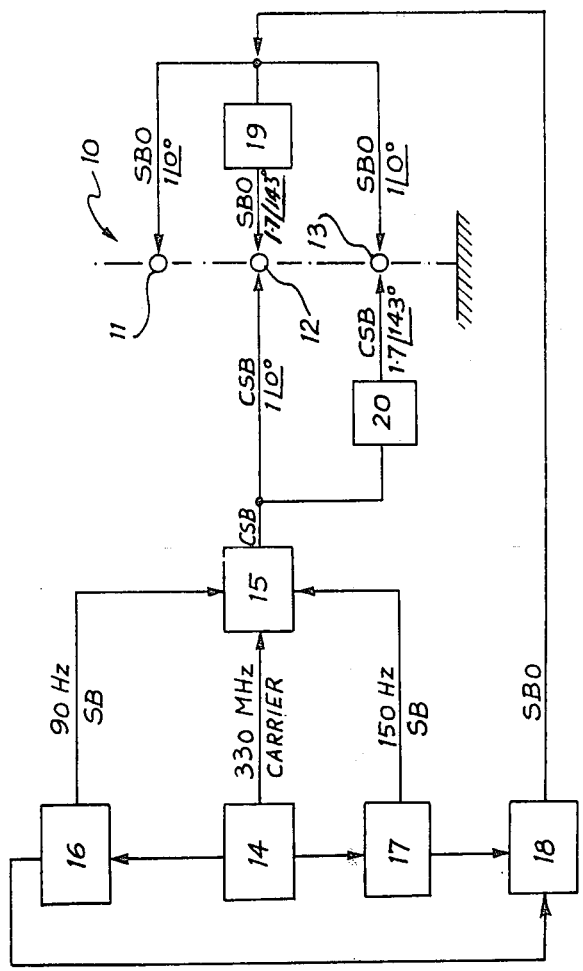

Reference is now made to FIG. 7 of the drawings which shows a complete array 10 having the three elements and excitation shown in FIGS. 4a and 4b. Although not so shown, each element 11 to 13 preferably comprises a single dipole mounted within a corner reflector, and the dipoles are equally spaced. For a 3° glidepath, the array is 13 meters high and has a ground clearance for the lowermost element 13 of 4.34 meters.

A reference signal generator 14 provides a carrier frequency of 330 MHz which is fed to a mixer 15, which receives also 90 Hz and 150 Hz sideband signals from generators 16 and 17 respectively. The sideband signals from generators 16 and 17 are also applied to a mixer 18, which provides a sideband only (SBO) output signal. This SBO signal comprises 180° phase displaced 90 Hz and 150 Hz sidebands centred about a suppressed 330 MHz carrier frequency.

The SBO signal is applied directly to the uppermost and lowermost elements 11 and 13 of the array and, via an amplitude and phase adjusting network 19, to the centre element 12 of the array.

The output from the mixer 15, comprising the reference carrier equally modulated by phase locked 90 Hz amd 150 Hz tones, i.e. the CSB signal, is applied directly to the centre element 12 of the array and, via an amplitude and phase adjusting network 20 to lowermost element 13 of the array.

We claim:

1. A drive arrangement for an instrument landing system antenna array having three substantially equispaced elements arrayed vertically above a ground plane, all three elements being arranged to be driven to radiate SBO energy and the lowermost and central element being arranged to be driven to radiate also CSB energy; the relative amplitudes and phases of the drive signals being to the centre element, CSB $1\angle 0°$, to the lowermost element, CSB $1.7\angle 143°$, to the uppermost and lowermost elements, SBO $1\angle 0°$, and to the centre element, SBO $1.7\angle 143°$, the drive magnitudes being variable by $\pm 15\%$ and the phase angles being variable by $\pm 10°$.

2. An antenna array as claimed in claim 1, wherein the lowermost element is spaced above the ground plane by a distance substantially equal to the spacing between the array elements.

* * * * *